C. S. ADAMS.
VALVE FOR FILLING BOTTLES.
Reissued Dec. 4, 1917.
APPLICATION FILED SEPT. 28, 1917.
14,400.
Fig. 1,
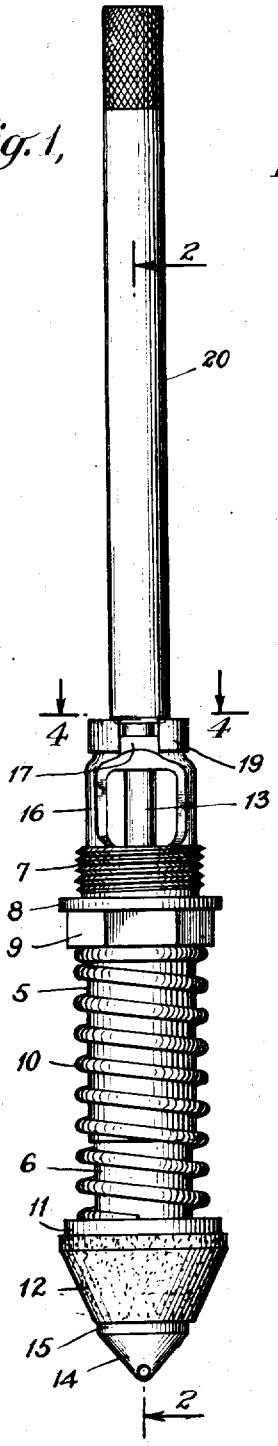
Fig. 2,
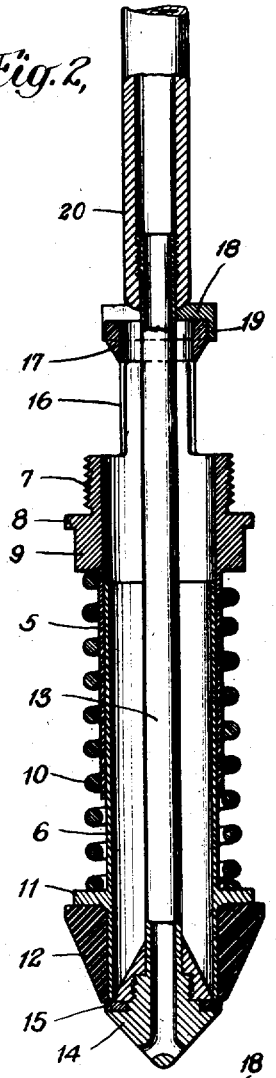
Fig. 3,
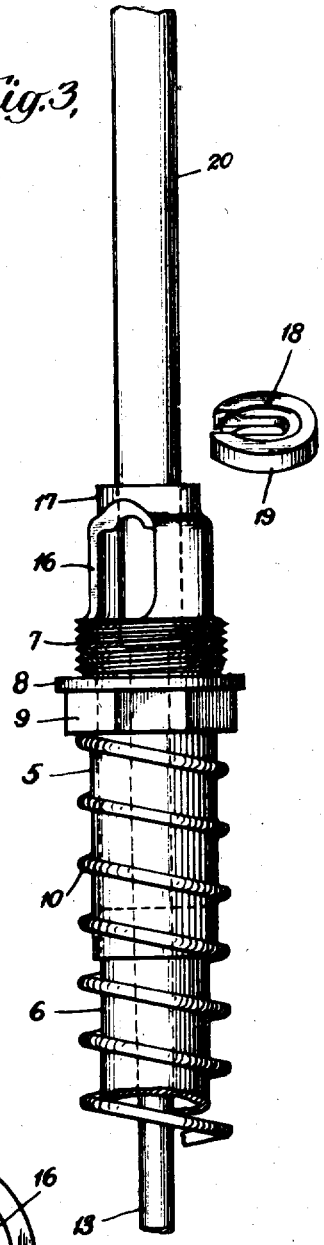
Fig. 4,
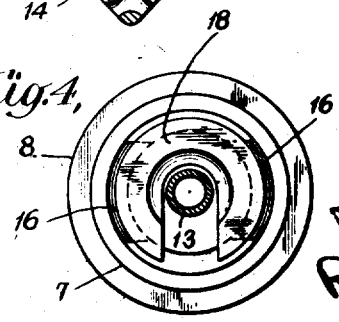
INVENTOR
Charles S. Adams,
BY
ATTORNEY

UNITED STATES PATENT OFFICE.

CHARLES S. ADAMS, OF BUFFALO, NEW YORK, ASSIGNOR TO RICE AND ADAMS CORPORATION, A CORPORATION OF NEW YORK.

VALVE FOR FILLING BOTTLES.

14,400. Specification of Reissued Letters Patent. Reissued Dec. 4, 1917.

Original No. 1,239,068, dated September 4, 1917, Serial No. 64,625, filed December 2, 1915. Application for reissue filed September 28, 1917. Serial No. 193,720½.

*To all whom it may concern:*

Be it known that I, CHARLES S. ADAMS, a citizen of the United States, residing in the city of Buffalo, county of Erie, and State of New York, have invented certain new and useful Improvements in Valves for Filling Bottles; and I do hereby declare the following to be a full, clear, and exact description of the invention, such as will enable others skilled in the art to which it appertains to make and use the same.

This invention is directed to the provision of an improved form of valve for use in filling bottles with a liquid from a suitable receptacle. The invention is of special utility in valves for use in filling milk bottles, a plurality of the valves being located in the bottom of a receptacle for the milk in positions to coact with the open necks of a plurality of bottles supported in a suitable crate which is raised vertically to carry the necks of the bottles into engagement with the valves.

Valves for this use have heretofore been commonly constructed consisting of two telescoping tubular members and a spring coiled about them to hold them normally extended, the lower end of the lower tubular member being adapted to be engaged by the neck of a milk bottle and raised thereby against the tension of the spring. In combination with these parts, an air tube is employed extending through the tubular members and provided with an enlargement at its lower end which coacts with the lower end of the lower tubular member to open and close the passage for the flow of the milk into a bottle. In valves of this character, various means have heretofore been devised for supporting the air tube. This tube should not be supported rigidly as sometimes its lower end is engaged by the neck of a bottle and the tube should therefore have a slight capacity for upward movement to guard against breaking the neck of the bottle. Also, the air tube should be supported in such a way that its support, or a portion thereof, may be readily withdrawn to permit the tube to be passed downwardly through the telescoping tubular members, as in this way the parts of the valve may be quickly detached one from another for cleaning.

With these ends in view, it has been proposed heretofore to mount a supporting device detachably upon the upper end of the tubular members arranged to coact with a shoulder on the air tube to support the latter and provided with a side opening whereby it may be moved laterally with respect to the air tube and thus become detached from the latter. Such a detachable support for the air tube I have found to be open to very serious objection in that it may, and in use frequently does, become unseated, thus requiring either that the milk be drawn off from the reservoir to permit of reseating the support or that the operator reach into the milk and position the support. It will be understood that when the crate of bottles is raised mechanically into coaction with the lower ends of the valves and the valves operated to open them, the parts of the valves are subjected to a severe jar which is frequently sufficient to cause the unseating of a relatively light supporting member not securely fastened in position.

I have found that this objectionable characteristic of such valves as heretofore made may be avoided, and for this purpose have devised an improved construction wherein the parts are so constructed and arranged as to eliminate all danger of disarrangement of the parts during the operation of the apparatus. The improvement consists primarily in forming the major portion of the support, that is, the portion provided with an opening through which the milk flows from the reservoir into the valve, integral with one of the tubular members of the valve. This portion of the support for the air tube has a ring at its upper end provided with a central opening of a size sufficient to permit the upper portion of the air tube to pass therethrough. This ring constitutes the support for another ring having a central opening of less size, the central opening in this second ring being only of the size of the air tube proper so that the shoulder on the air tube will engage the second ring and be supported thereby. This second ring is open on one side so that it may be withdrawn from the air tube to permit the latter to move downwardly and thus be disengaged from the other parts of the valve.

I have illustrated the preferred embodiment of my invention in the accompanying drawings, in which Figure 1 is an elevation of the valve; Fig. 2 is a central longitudinal section thereof; Fig. 3 is a view of the upper members of the valve with the supporting ring removed; and Fig. 4 is a transverse section on line 4—4 of Fig. 1.

Referring to these drawings, the valve comprises two vertically disposed concentric telescoping tubular members 5 and 6. The tubular member 5 constitutes the frame member of the valve and is provided with threads 7 adapted to coact with threads in an opening in the bottom of the receptacle for the milk to secure the valve in position upon the receptacle. Below these threads is a flange 8 adapted to engage the bottom of the receptacle and a polygonal portion 9 to which a wrench may be applied to secure the frame member in position or withdraw it therefrom. The tubular member 6 fits within the tubular member 5 and a spring 10 encircles these parts, this spring acting upon a flange 11 on the member 6 to force the latter downwardly. On the lower end of the tubular member 6 is a gasket 12 of rubber or other suitable soft material. The air tube is shown at 13. On its lower end it is provided with an enlargement 14 including a washer 15 which is adapted to coact with the lower end of the tubular member 6 to close and open the passage through the latter. The air tube has a central passage therethrough opening upon the sides of the conical enlargement 14 and its function is to permit the escape of air from a bottle upwardly through the air tube as the milk flows downwardly through the member 6 into the bottle.

The air tube 13 is so supported as to permit it to be moved upwardly by a bottle if the neck of the bottle engages the lower end of the tube. Also, it is so supported as to permit of its detachment from the supporting means in which case the air tube may be lowered through the tubular members 5 and 6 and disengaged therefrom, whereupon the parts 5, 6 and 10 may be disengaged. In this way, all of the parts of the valve may be quickly detached for cleaning.

The means for supporting the air tube 13 consists of parts extending upwardly from the tubular member 5 and formed integral therewith, and a detachable supporting device seated upon these parts. In the drawings, it will be seen that the tubular member 5 which is adapted to be secured to the bottom of the reservoir is extended upwardly by struts or standards 16 which are formed integral with the tubular member 5. At the upper end of these struts or standards 16 is a ring 17 also formed as an integral part of the tubular member 5. It will be noted, particularly from Fig. 1, that below this ring 17 openings are provided between the struts 16 leading to the interior of the tubular member 5, and it is through these openings that the milk passes from the reservoir into the valve. The ring 17 has a central opening therethrough and the air tube 13 passes through this opening, but the opening is of substantially larger diameter than the diameter of the tube. This ring 17 forms a seat for a second ring 18. This ring 18 has a depending flange 19 such that when it is seated upon the ring 17, the flange 19 extends down along the periphery of the ring 17 a substantial amount and thus holds the ring 18 upon its seat upon the ring 17 so securely as to quite effectually guard against displacement of the detachable ring 18 by jarring of the parts. The ring 18 has a central opening therethrough which is of less size than the opening in the ring 17; it is large enough to receive the air tube 13 but is of less size than the enlargement or shoulder on the air tube. Also, this ring 18 is open on one side, that is, it is slotted to form a passage for the air tube 13 through the side of the ring to the central opening thereof. The shoulder upon the air tube is preferably provided by securing a supporting tube 20 to the upper end of the tube 13, the lower end of this tube 20 forming the shoulder and the tube extending the passage for the air upwardly above the surface of the liquid in the reservoir.

Fig. 1 shows the parts of the valve in the positions which they normally occupy. When in this position, the parts are supported with such a degree of rigidity that all danger of accidental detachment is eliminated. This is due primarily to the formation of the struts 16 and ring 17 as integral parts of the upper tubular member 5. It is also due to the fact that the ring 18, by reason of its flange 19, seats itself upon the ring 17 very securely. If it be desired to disassemble the valve, the air tube 13 and the member 6 are moved upwardly relatively to the member 5 against the tension of spring 10 a slight amount, whereupon the ring 18 is raised from its seat and withdrawn by a lateral movement from the air tube 13, as shown in Fig. 3. The air tube may then be lowered, the shoulder at the lower end of the larger tube 20 passing through the ring 17 and the tubular members 5 and 6.

What I claim is:

1. A bottle filling valve comprising the combination of upper and lower telescoping tubular members, a spring for positioning the two members relatively, an air tube passing through the two members and having an enlargement at its lower end adapted to coact with the lower end of the lower tubular member, standards extending upwardly from the upper tubular member and formed integral therewith, a ring carried by the upper ends of said standards and formed integral therewith, the air tube passing through the opening in said ring, and a second ring seated upon said ring and provided with a central opening which is open to one side of the ring, said last named ring being adapted to coact with a shoulder on the air tube to support the air tube relatively to said tubular members; substantially as described.

2. A bottle filling valve comprising the combination of upper and lower telescoping tubular members, a spring for positioning the two members relatively, an air tube passing through the two members and having an enlargement at its lower end adapted to coact with the lower end of the lower tubular member, standards extending upwardly from the upper tubular member and formed integral therewith, a ring carried upon the upper ends of the standards and formed integral therewith and having a central opening through which the air tube passes, a detachable ring seated upon said ring, and a peripheral flange on the detachable ring overlapping the edge of the seat for the ring, said detachable ring being slotted from one side to the center thereof to receive the air tube and coact with a shoulder upon the air tube to support the latter relatively to said tubular members; substantially as described.

3. A bottle filling valve comprising the combination of upper and lower telescoping tubular members, a spring for positioning the two members relatively, an air tube passing through the two members and having an enlargement at its lower end adapted to coact with the lower end of the lower tubular member, standards extending upwardly from the upper tubular member and formed integral therewith, a ring carried by the upper ends of said standards and formed integral therewith, the air tube passing through the opening in said ring, and a second ring seated upon but detachable from said ring and provided with a central opening which is open to one side of the ring, said air tube having a shoulder thereon and the central opening through the first named ring being of such size that the shoulder on the air tube can pass therethrough and the central opening in the said detachable ring being of such size that the shoulder on the air tube cannot pass therethrough; substantially as described.

4. A bottle filling valve comprising the combination of upper and lower telescoping tubular members, a spring for positioning the two members relatively, an air tube passing through the two members and having an enlargement at its lower end adapted to coact with the lower end of the lower tubular member, standards extending upwardly from the upper tubular member and formed integral therewith, a ring located at and integral with the upper ends of the standards and having a central opening through which the air passes, a detachable ring seated upon said ring and having a central opening and a slot extending from the central opening to the periphery of the ring, and a peripheral flange on the detachable ring overlapping the edge of the seat for the ring, said air tube having a shoulder thereon and the central opening through the first named ring being of such size that the shoulder on the air tube can pass therethrough and the central opening in the said detachable ring being of such size that the shoulder on the air tube cannot pass therethrough; substantially as described.

In testimony whereof I affix my signature.

CHARLES S. ADAMS.

Copies of this patent may be obtained for five cents each, by addressing the "Commissioner of Patents, Washington, D. C."